(12) United States Patent
Beatenbough et al.

(10) Patent No.: US 11,649,952 B2
(45) Date of Patent: May 16, 2023

(54) CEILING LIGHT LED RETROFIT KIT

(71) Applicant: POWER CONCEPTS, LLC, Anderson, SC (US)

(72) Inventors: Bryan Beatenbough, Anderson, SC (US); Ryan Haley, Hartwell, GA (US)

(73) Assignee: POWER CONCEPTS, LLC, Anderson, SC (US)

( * ) Notice: Subject to any disclaimer, the term of this patent is extended or adjusted under 35 U.S.C. 154(b) by 0 days.

(21) Appl. No.: 17/023,506

(22) Filed: Sep. 17, 2020

(65) Prior Publication Data
US 2021/0003268 A1 Jan. 7, 2021

Related U.S. Application Data

(63) Continuation of application No. 16/546,729, filed on Aug. 21, 2019, now Pat. No. 10,837,628, which is a
(Continued)

(51) Int. Cl.
*F21V 21/03* (2006.01)
*F21S 8/04* (2006.01)
(Continued)

(52) U.S. Cl.
CPC ............... *F21V 21/03* (2013.01); *F21S 8/04* (2013.01); *F21V 5/04* (2013.01); *F21V 3/02* (2013.01);
(Continued)

(58) Field of Classification Search
CPC .......... F21K 9/272; F21K 9/275; F21K 9/278; F21K 9/27; F21V 21/02; F21V 21/025; F21V 21/03; F21Y 2115/10
See application file for complete search history.

(56) References Cited

U.S. PATENT DOCUMENTS

| 3,673,402 A | 6/1972 | Weiss |
| 6,739,734 B1 | 5/2004 | Hulgan |
(Continued)

FOREIGN PATENT DOCUMENTS

| CA | 2816449 C | 8/2014 |
| CN | 10636663 A | 12/2019 |
| KR | 102070096 B1 | 1/2020 |

OTHER PUBLICATIONS

IPR Case No. IPR2022-00534 ('628 IPR).
(Continued)

*Primary Examiner* — Robert J May
(74) *Attorney, Agent, or Firm* — Parker Poe Adams & Bernstein, LLP

(57) ABSTRACT

A combination for illuminating the interior of a building comprises a fixture and a retrofit kit. The fixture has a base attached to a building ceiling, the fixture having a first tombstone, and a second tombstone. The first and second tombstones are configured to receive between them a fluorescent light tube. The retrofit kit is connected to the base. The retrofit kit includes a light panel, the light panel having a first side facing the fixture and an opposite second side. The light panel resides between the first tombstone and the second tombstone, and the fixture resides above the light panel. The combination is devoid of a fluorescent light tube. The base and the light panel define between them a raceway. A light emitting diode is disposed on the second side of the light panel.

21 Claims, 8 Drawing Sheets

Related U.S. Application Data continuation of application No. 15/441,447, filed on Feb. 24, 2017, now Pat. No. 10,429,041.

(60) Provisional application No. 62/299,295, filed on Feb. 24, 2016.

(51) Int. Cl.
| | |
|---|---|
| *F21V 5/04* | (2006.01) |
| *F21V 3/02* | (2006.01) |
| *F21V 15/015* | (2006.01) |
| *F21Y 115/10* | (2016.01) |
| *F21Y 107/10* | (2016.01) |

(52) U.S. Cl.
CPC ......... *F21V 15/015* (2013.01); *F21Y 2107/10* (2016.08); *F21Y 2115/10* (2016.08); *Y02B 20/30* (2013.01)

(56) References Cited

U.S. PATENT DOCUMENTS

| | | | |
|---|---|---|---|
| 6,969,179 | B2 | 11/2005 | Sloan et al. |
| 7,114,830 | B2 | 10/2006 | Robertson et al. |
| 7,296,911 | B2 | 11/2007 | Plunk et al. |
| 7,311,423 | B2 | 12/2007 | Freeska |
| 7,351,075 | B1 | 4/2008 | Patterson |
| 7,438,441 | B2 | 10/2008 | Sun et al. |
| 7,476,004 | B2 | 1/2009 | Chan |
| 7,507,001 | B2 | 3/2009 | Kit |
| 7,614,195 | B2 | 11/2009 | Platt |
| 7,661,229 | B2 | 2/2010 | Freeska |
| 7,679,222 | B2 | 3/2010 | Patterson |
| 7,762,821 | B2 | 7/2010 | Patterson |
| 7,936,129 | B2 | 5/2011 | Gwisdalla et al. |
| 7,997,910 | B2 | 8/2011 | Meyers |
| 8,062,042 | B2 | 11/2011 | Patterson |
| 8,272,763 | B1 | 9/2012 | Chinnam |
| 8,584,412 | B2 | 11/2013 | Freeska |
| 8,740,626 | B2 | 6/2014 | Myers |
| 8,789,966 | B2 * | 7/2014 | McCanless ............. F21V 7/005 362/218 |
| 8,881,481 | B2 | 11/2014 | Myers |
| 8,896,208 | B2 | 11/2014 | Shew |
| 9,163,794 | B2 | 10/2015 | Simon et al. |
| 9,182,107 | B2 | 11/2015 | Ekey et al. |
| 9,243,757 | B2 | 1/2016 | Barnetson et al. |
| 9,243,759 | B2 | 1/2016 | Lin et al. |
| 9,255,667 | B2 | 2/2016 | Zhang |
| 9,307,598 | B2 * | 4/2016 | Maa .................... F21V 23/0435 |
| 9,380,654 | B2 | 6/2016 | Dankovits et al. |
| 9,469,988 | B2 | 10/2016 | Myers et al. |
| 9,550,401 | B2 | 1/2017 | Hinz |
| 9,726,331 | B1 | 8/2017 | May |
| 9,845,596 | B2 | 12/2017 | Frantz et al. |
| 9,951,916 | B2 | 4/2018 | Oleske et al. |
| 10,253,962 | B2 | 4/2019 | Xiao et al. |
| 10,288,240 | B2 | 5/2019 | Szeto et al. |
| 10,429,041 | B2 | 10/2019 | Beatenbough et al. |
| 10,837,628 | B2 | 11/2020 | Beatenbough et al. |
| 2006/0221606 | A1 | 10/2006 | Dowling |
| 2007/0165399 | A1 | 7/2007 | Yaphe |
| 2010/0289428 | A1 | 11/2010 | Frazier |
| 2010/0315001 | A1 | 12/2010 | Domagala |
| 2012/0113628 | A1 | 5/2012 | Burrow |
| 2014/0168961 | A1 | 6/2014 | Dubord |
| 2014/0268748 | A1 * | 9/2014 | Lay ........................ F21V 5/04 362/235 |
| 2015/0003070 | A1 * | 1/2015 | Medendorp, Jr. ......... F21K 9/27 362/294 |
| 2015/0345751 | A1 | 12/2015 | Oksengendler et al. |
| 2016/0153641 | A1 | 6/2016 | Fang et al. |
| 2019/0041009 | A1 | 2/2019 | May |
| 2019/0072261 | A1 | 3/2019 | Gorman et al. |
| 2019/0086060 | A1 | 3/2019 | Gorman et al. |
| 2020/0275540 | A1 | 8/2020 | O'Kell et al. |

OTHER PUBLICATIONS

IPR Case No. IPR2022-00569 ('041 Petition).
ILP Retrofit Video Transcript (ILP Transcript).
ILP Low Profile Webinar Slides, "Low Profile Channel LED Fixture or Retrofit" (ILP Retrofit Video Screenshots).
ILP Low Profile Webinar Slides, "Low Profile Channel LED Fixture or Retrofit" (ILP Retrofit Webinar Slides).

* cited by examiner

CEILING LIGHT LED RETROFIT KIT

CROSS REFERENCE TO RELATED APPLICATIONS

This application is a continuation of, and claims the benefit of priority to, U.S. application Ser. No. 16/546,729, filed Aug. 21, 2019, which is a continuation of, and claims the benefit of priority to, U.S. application Ser. No. 15/441,447, filed on Feb. 24, 2017, now issued as U.S. Pat. No. 10,429,041, which claims the benefit of priority of U.S. Provisional Application Ser. No. 62/299,295, filed on Feb. 24, 2016, which is incorporated herein in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIALS SUBMITTED ON A COMPACT DISC OR AS A TEXT FILE VIA THE OFFICE ELECTRONIC FILING SYSTEM

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention is directed toward a ceiling light LED retrofit kit; more specifically, a kit for installation of light emitting diode lighting mounted upon a previously-installed fluorescent lighting fixture.

Description of the Related Art

Fluorescent lighting is commonly used in commercial building and office interiors. A typical fluorescent lighting fixture includes a base that is mounted to a ceiling within a building. Carried upon the base is a first electrical receptacle and a second electrical receptacle, with a fluorescent light tube extending between and energized by the two electrical receptacles. A ballast for controlling the electrical power to the fluorescent light tube is connected to the first and second electrical receptacles.

From an aesthetic standpoint, such fluorescent lighting often exposes bare fluorescent light tubes to occupants of the building. From an energy standpoint, fluorescent lighting does not most efficiently convert electrical energy into illumination.

Recent interest has arisen toward converting existing previously-installed fluorescent lighting to lighting provided by light emitting diodes ("LED"). LED lighting is more energy efficient than fluorescent lighting. It has been found that conversion from a fluorescent lighting fixture to an LED lighting fixture will provide a return on investment, in reduced energy consumption, sufficient to justify over time the costs of converting from fluorescent lighting to LED lighting.

Unfortunately, the previously-known methods and devices for converting from fluorescent lighting to LED lighting are not optimized. Various of the previously-known such devices require removal, in whole or in part, of the existing fluorescent lighting fixture. More specifically, the previously-known methods of such conversion require removal of at least the base, the electrical receptacles, and the ballast of the fluorescent lighting fixture, or some combination of such components, before an LED lighting system may be installed in its place. Furthermore, the previously-known methods of such conversion also require intensive use of skilled electricians to wire each of the new LED lighting devices, which increases the costs of such conversions.

In view of the foregoing, it would be desirable to have a ceiling light LED retrofit kit optimized to reduce installation time, to reduce the need for services from a skilled electrician, and to leave in place as much of the previously-installed fluorescent lighting apparatus as possible thereby saving labor, reducing waste, and improving return on investment.

BRIEF SUMMARY OF THE INVENTION

The following simplified summary of the invention provides a basic understanding of some aspects of the invention. This summary is not an extensive overview of the invention. Its purpose is to present concepts of the invention in a simplified form as a prelude to the more detailed description that is subsequently presented.

A simplified, optimized ceiling light retrofit kit is provided.

In accordance with some aspects of some embodiments of the present invention, the ceiling light LED retrofit kit includes a combination for illuminating the interior of a building. The combination comprises first a fixture attached to a building ceiling, and adapted for use of linear fluorescent light tubes. The fixture includes a base, a first electrical receptacle, and a second electrical receptacle, the first and second electrical receptacles configured for receipt of a fluorescent light tube disposed between them. The base includes a first longitudinal side and an opposite second longitudinal side.

The combination further includes a retrofit kit, the retrofit kit including a light panel, a first profile, and a second profile. The light panel includes a first side facing the fixture and an opposite second side. The light panel, the first profile, and the second profile may extend longitudinally from proximate the first electrical receptacle to proximate the second electrical receptacle, and be parallel one-to-another.

The retrofit kit also includes at least one light emitting diode, the at least one light emitting diode residing on the second side of the light panel.

The first profile extends from the light panel to the first longitudinal side of the base and is engaged therewith. The second profile extends from the light profile to the second longitudinal side of the base, and is engaged therewith.

The first profile, the second profile, light panel, and base define therebetween a raceway.

Wiring, in electrical communication with the light emitting diode, resides within the raceway.

The foregoing description sets forth broadly certain features of the present invention, so that the detailed description herein below may be better understood, and so that the present contributions to the art from this invention may be better appreciated. Additional features of the invention will be described herein below.

BRIEF DESCRIPTION OF THE SEVERAL VIEWS OF THE DRAWINGS

The aspects described above, as well as other apparent aspects, advantages, and objectives of the present invention are apparent from the detailed description below, in combination with the drawings, in which.

DETAILED DESCRIPTION OF REPRESENTATIVE EMBODIMENTS

Figure 1:
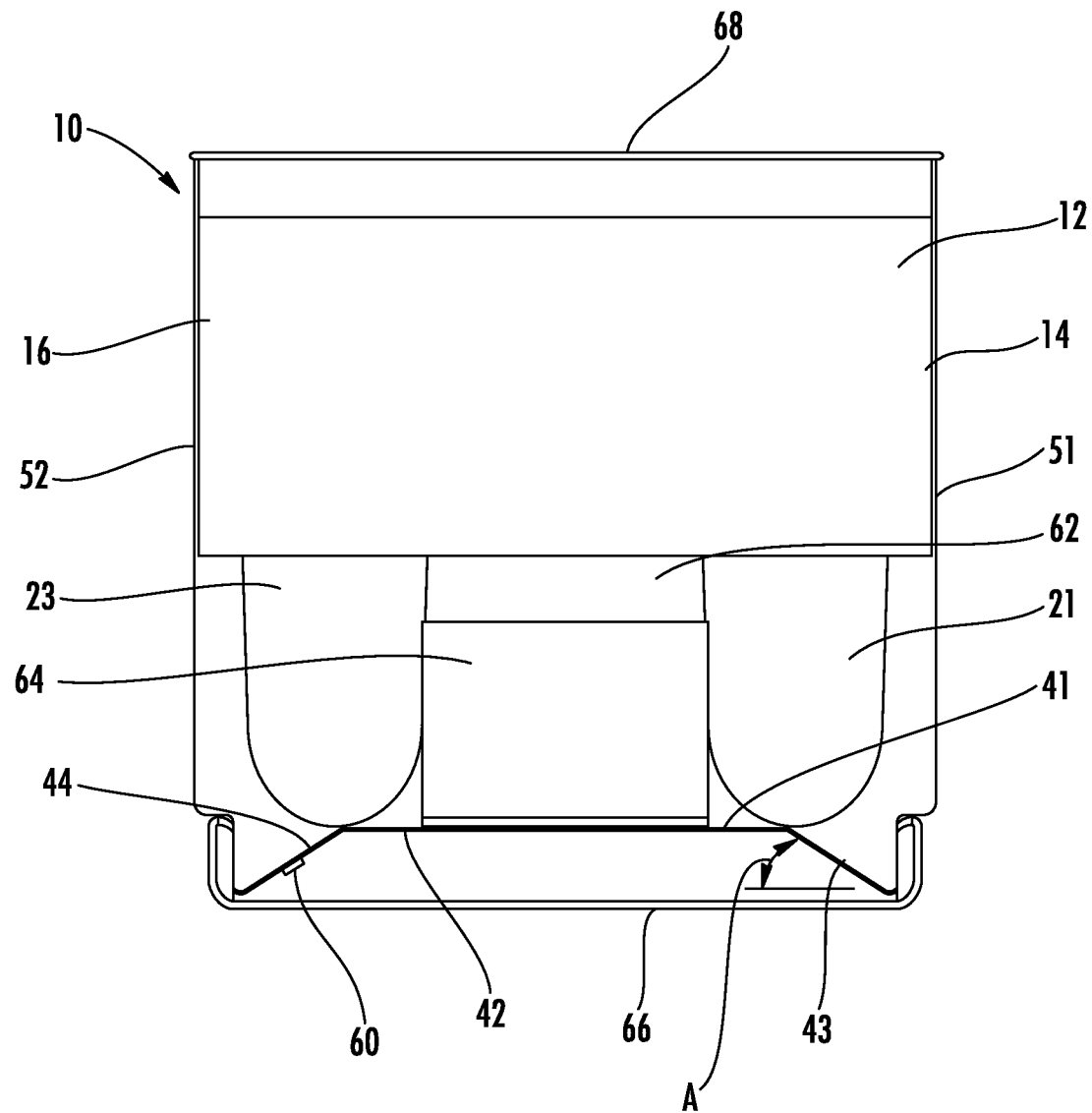
FIG. 1 is an end elevation view of an embodiment of a ceiling light LED retrofit kit in accordance with the present invention.

Reference will now be made in detail to the presently preferred embodiments of the invention, one or more examples of which are illustrated in the drawings. Each example is provided by way of explanation of the invention, and not by way of limitation of the invention. For example, features illustrated or described as part of one embodiment may be used on another embodiment to yield a still further embodiment. It is intended that the present application include such modifications and variations as come within the scope and spirit of the invention.

A ceiling light LED retrofit kit 30 is disclosed.

Retrofit kit 30 may be understood in certain embodiments to be included in a combination with a fixture 10.

Fixture 10 may include a pre-installed base 12 attached to the interior ceiling 68 of a building. Base 12 may be understood to define a first longitudinal side 14 and an opposed second longitudinal side 16. Base 12 may also include a first electrical receptacle 21, a second electrical receptacle 22, a third electrical receptacle 23, and so forth. First electrical receptacle 21 and second electrical receptacle 22 may be configured and positioned for receipt of a linear fluorescent light tube disposed between them and energized by them.

Generally, retrofit kit 30 is adapted to conceal or obscure the pre-installed base 12 so as to provide the appearance that the fixture 10 is new or completely replaced. Retrofit kit 30 may include a light panel 40. Light panel 40 may define a first side 41 that faces fixture 10 and an opposed second side 42. In some embodiments, the light panel 40 may include a first angled wing 43 and a second angled wing 44. One or more light emitting diode 60 may be disposed on second side 42 of light panel 40. In certain embodiments, it may be found that disposing a light emitting diode 60 on first angled wing 43 or second wing 44 provides a more desirable path of illumination from light emitting diode 60. Retrofit kit 30 may also include a power supply 64, to energize the LED 60.

Retrofit kit 30 may also include a first profile 51 and second profile 52. The first profile 51 and/or second profile 52 may be integral with light panel 40, which may be disposed between the first profile 51 and the second profile 52. In other embodiments, first profile 51 and/or second profile 52 may be separate members that are attached to light panel 40, for example, at opposing, longitudinal edges of light panel 40.

Light panel 40, first profile 51, and second profile 52 may extend longitudinally from proximate the first electrical receptacle 21 to proximate the second electrical receptacle 22.

First profile 51 may extend from light panel 40 to first longitudinal side 14 of base 12 of fixture 10. Second profile 52 may extend from light panel 40 to the second longitudinal 16 of base 12 of fixture 10.

First profile 51 and second profile 52 may each be flat or may instead include a rib 59 that extends longitudinally from one end of the profile to the opposing end, respectively. Rib 59 may be optionally included to provide enhanced stiffness to first profile 51 and/or second profile 52

First profile 51 and second profile 52 may be attached to first longitudinal side 14 and second longitudinal side 16, respectively. With first profile 51 attached to first longitudinal side 14 and second profile 52 attached to second longitudinal side 16, first profile 51, second profile 52, light panel 40, and base 12 may define between them a raceway 62. Upon final assembly, electrical wiring in electrical communication with light emitting diode 60 may reside within raceway 62. Furthermore, power supply 64 for the LED 60 may be stored in raceway 62.

When attached to pre-installed base, the present ceiling light LED retrofit kit is adapted to conceal the prior components and to provide the appearance of a new or replaced light fixture.

FIG. 1 illustrates an embodiment of the present ceiling light LED retrofit kit. Base 12 of fixture 10 is attached to ceiling 68. Base 12 includes first longitudinal side 14 and second longitudinal side 16. As illustrated in FIG. 1, first electrical receptacle 21 and third electrical receptacle 23, which had previously been used in base 12 to hold and power a longitudinal fluorescent light tube, may be left within the ceiling light LED retrofit kit. As also illustrated, power supply 64, used to energize the LED, may be simply located within raceway 62.

In the embodiment illustrated in FIG. 1, light panel 40, first profile 51, and second profile 52 are integral. In other embodiments, first profile 51 and second profile 52 may be separate elements that have been attached to light panel 40.

First profile 51 is attached to first longitudinal side 14 of base 12 of fixture 10. Second profile 52 is attached to second longitudinal side 16 of base 12 of fixture 10.

A light emitting diode 60 may be disposed on second angled wing 44 of light panel 40. Light emitting diode 60 is in electrical communication with an electrical power source (not shown).

A lens 66 may be attached to light panel 40, as illustrated in FIG. 1. Lens 66 may be configured to provide a pleasing and esthetically attractive dispersion of light emitted from light emitting diode 60. FIG. 1 illustrates an angle A formed between the surface of first angled wing 43 and the surface of the lens 66, when attached.

Figure 2:
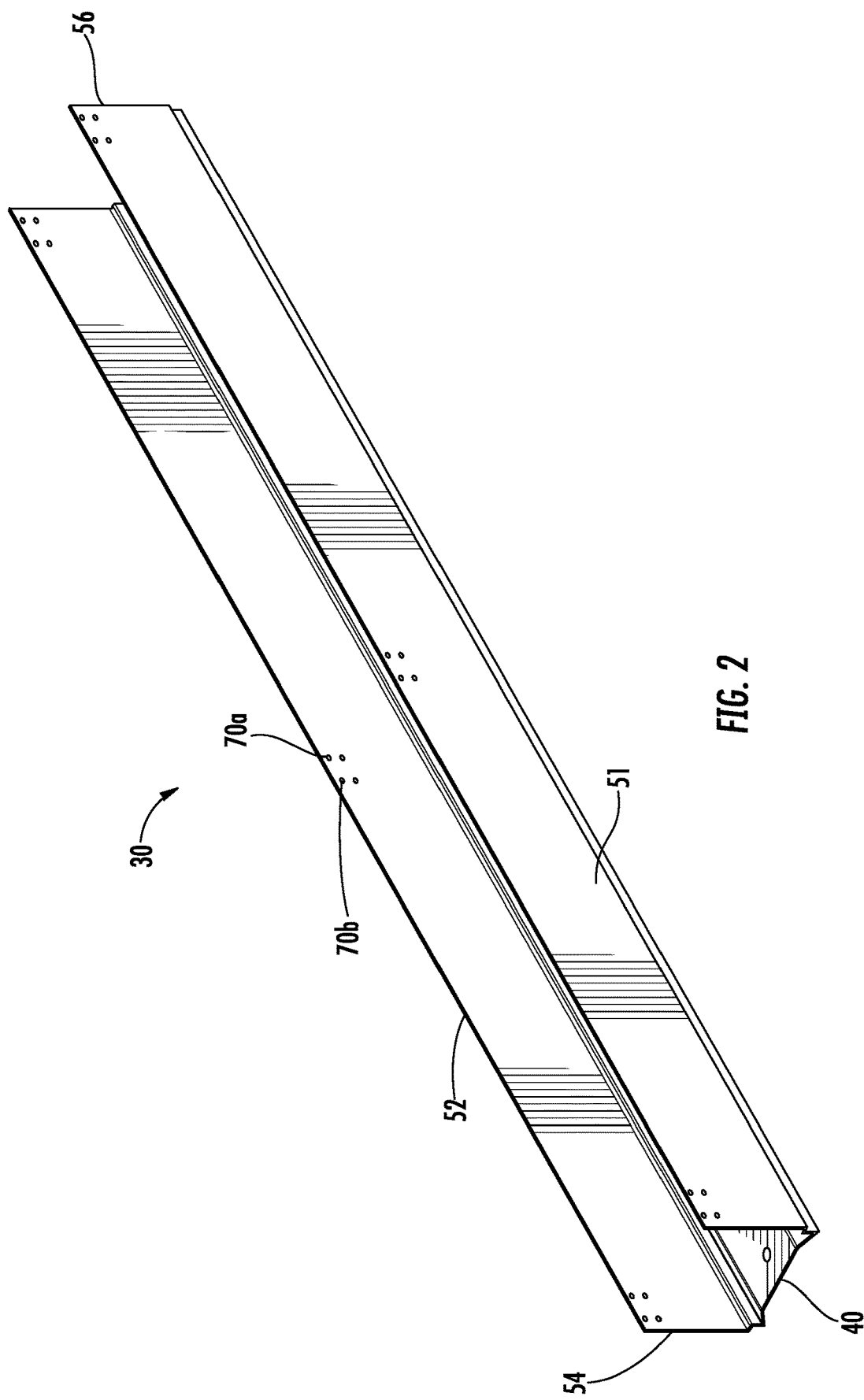
FIG. 2 is a perspective view of an embodiment of a portion of a retrofit kit in accordance with the present invention.

FIG. 2 illustrates an embodiment of a retrofit kit 30. As depicted therein, retrofit kit 30 includes a first profile 51, extending longitudinally, and a second profile 52 extending longitudinally. First profile 51 and second profile 52 may include a plurality of apertures, for example, 70*a* and 70*b*, for attachment to base 12 of fixture 10.

Figure 3:
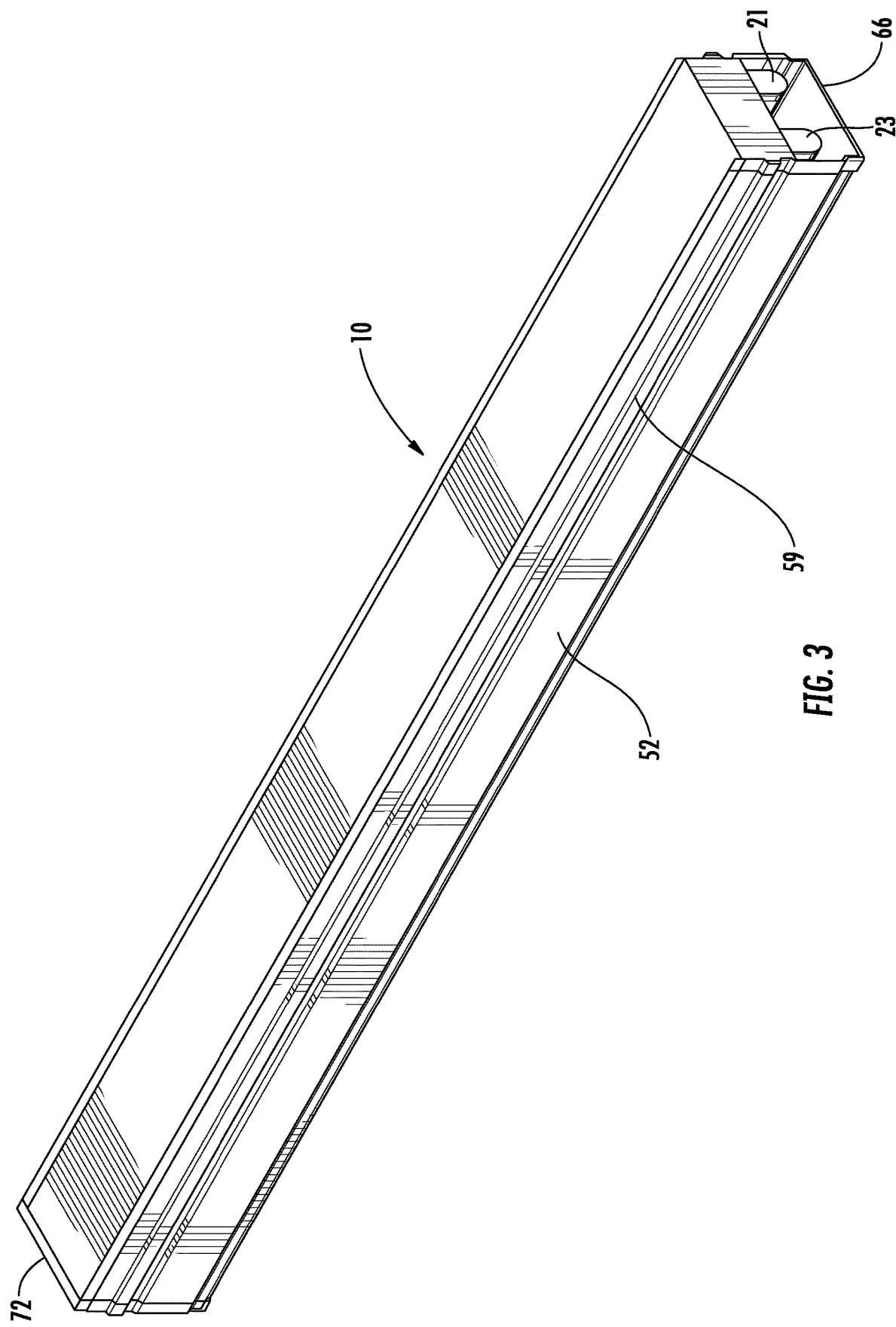
FIG. 3 is a perspective view of an embodiment of a ceiling light LED retrofit kit in accordance with the present invention.
Figure 4:
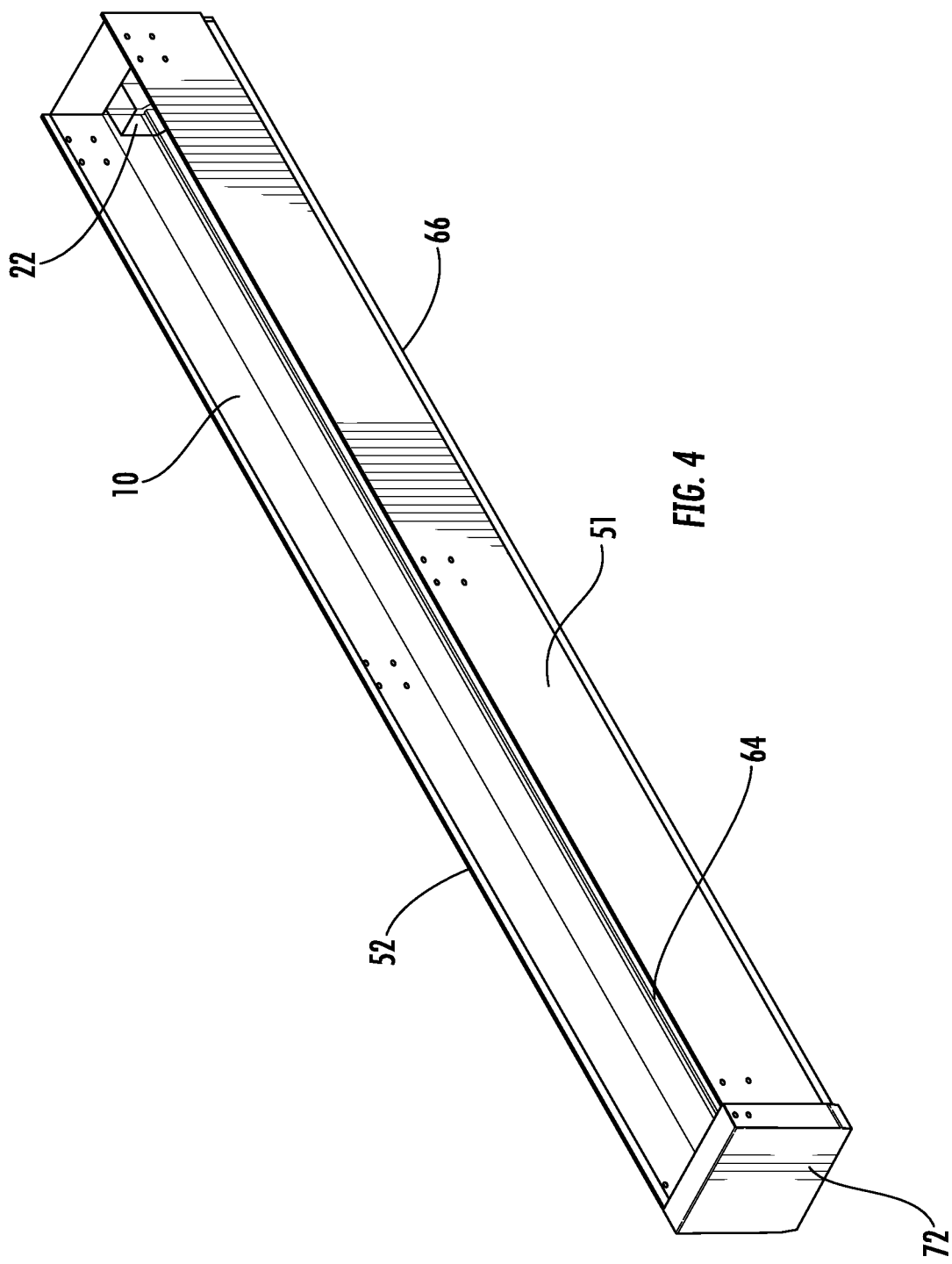
FIG. 4 is a perspective view of an embodiment of a ceiling light LED retrofit kit in accordance with the present invention.

FIGS. 3 and 4 are illustrations of an assembled LED retrofit kit. In FIG. 3, retrofit kit 30 includes a first profile 51, extending longitudinally, and a second profile 52 extending longitudinally. In this embodiment, first profile 51 and second profile 52 are separate. A lens 66 is illustrated as attached to first profile and second profile, such as by an endcap or clip, for example, 72 (shown in FIG. 7). As illustrated, first profile 51 and second profile 52 may include one or more longitudinal ribs, for example, 59, complimenting and corresponding to one or more endcap ribs. Second profile 52 is illustrated as attached to first longitudinal side 14 of base 12 of fixture 10.

FIG. 4 is an illustration of an assembled LED retrofit kit. Fixture 10, which includes second electrical receptacle 22, is illustrated in phantom. First profile 51 is illustrated as attached to first longitudinal side 14 of base 12 of fixture 10. Power supply 64 is illustrated as residing within raceway 62 and endcap 72 is shown in place upon the assembly.

Figure 5:
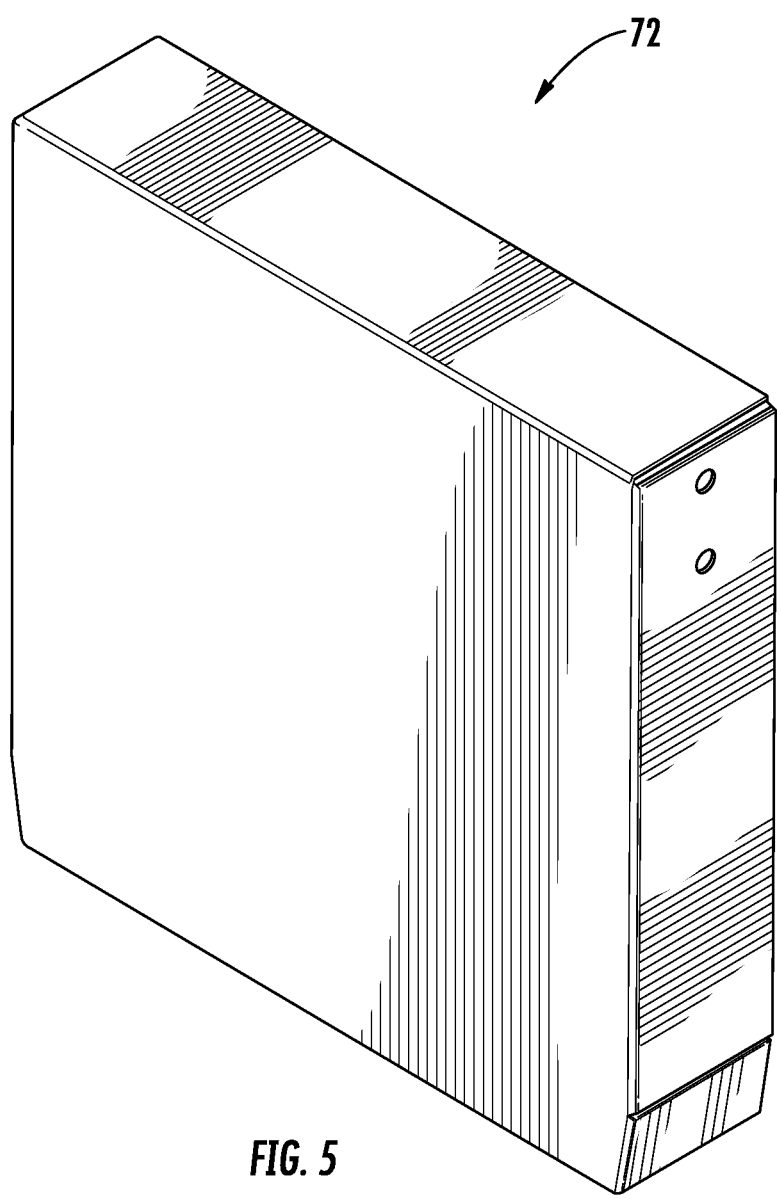
FIG. 5 is a perspective view of an embodiment of an endcap of a ceiling light LED retrofit kit in accordance with the present invention.

FIG. 5 is a perspective view of an endcap 72, for use with one embodiment of the present ceiling light LED retrofit kit.

Figure 6:
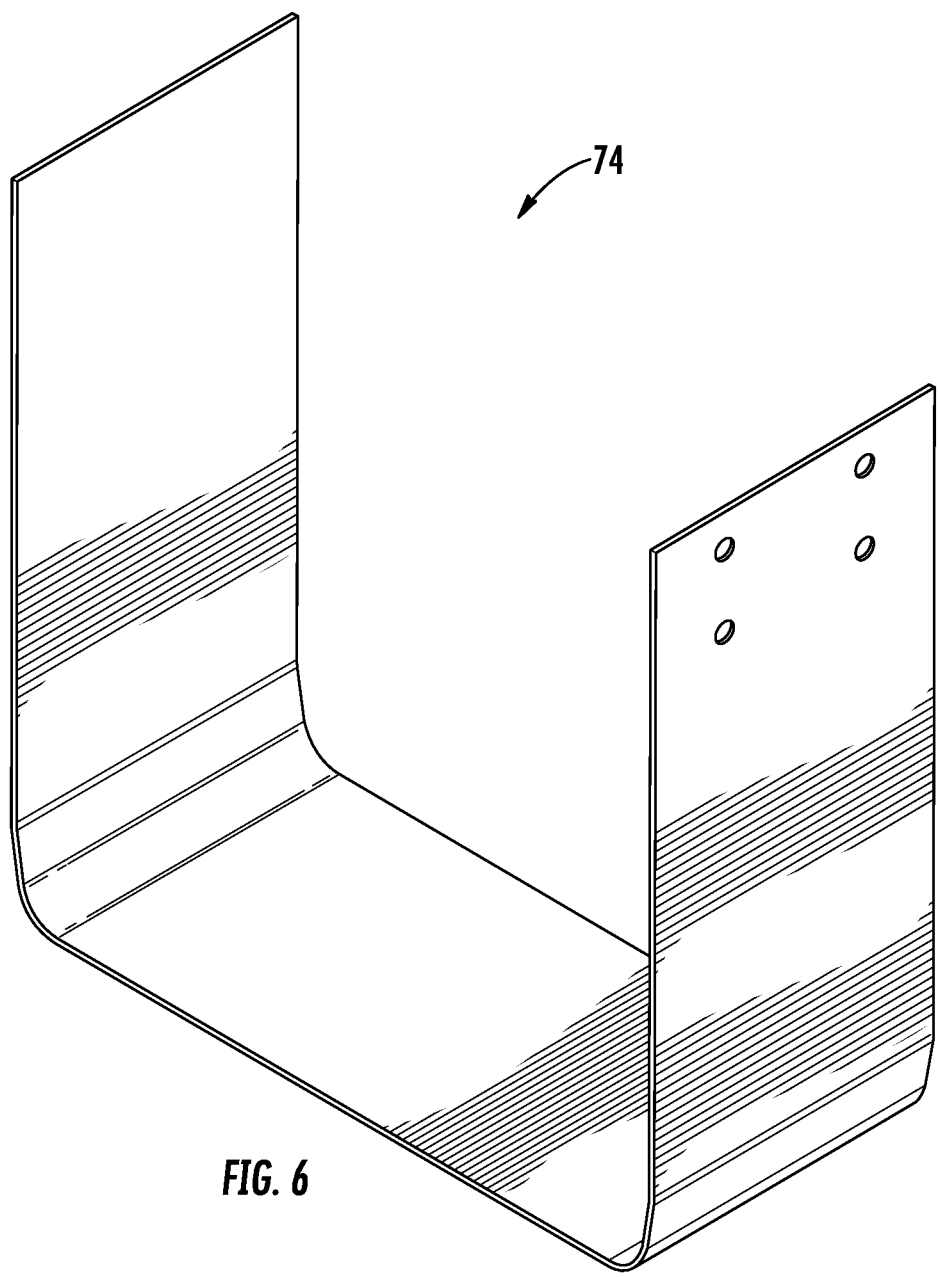
FIG. 6 is a perspective view of an embodiment of a splice of a ceiling light LED retrofit kit in accordance with the present invention

In particular applications, a plurality of light panels 40 may be disposed end to end in electrical series, for particular advantages. In such configurations, a splice 74 may be used at the juncture of any two abutting light panels 40. An embodiment of a splice 74 is depicted in FIG. 6.

Figure 7:
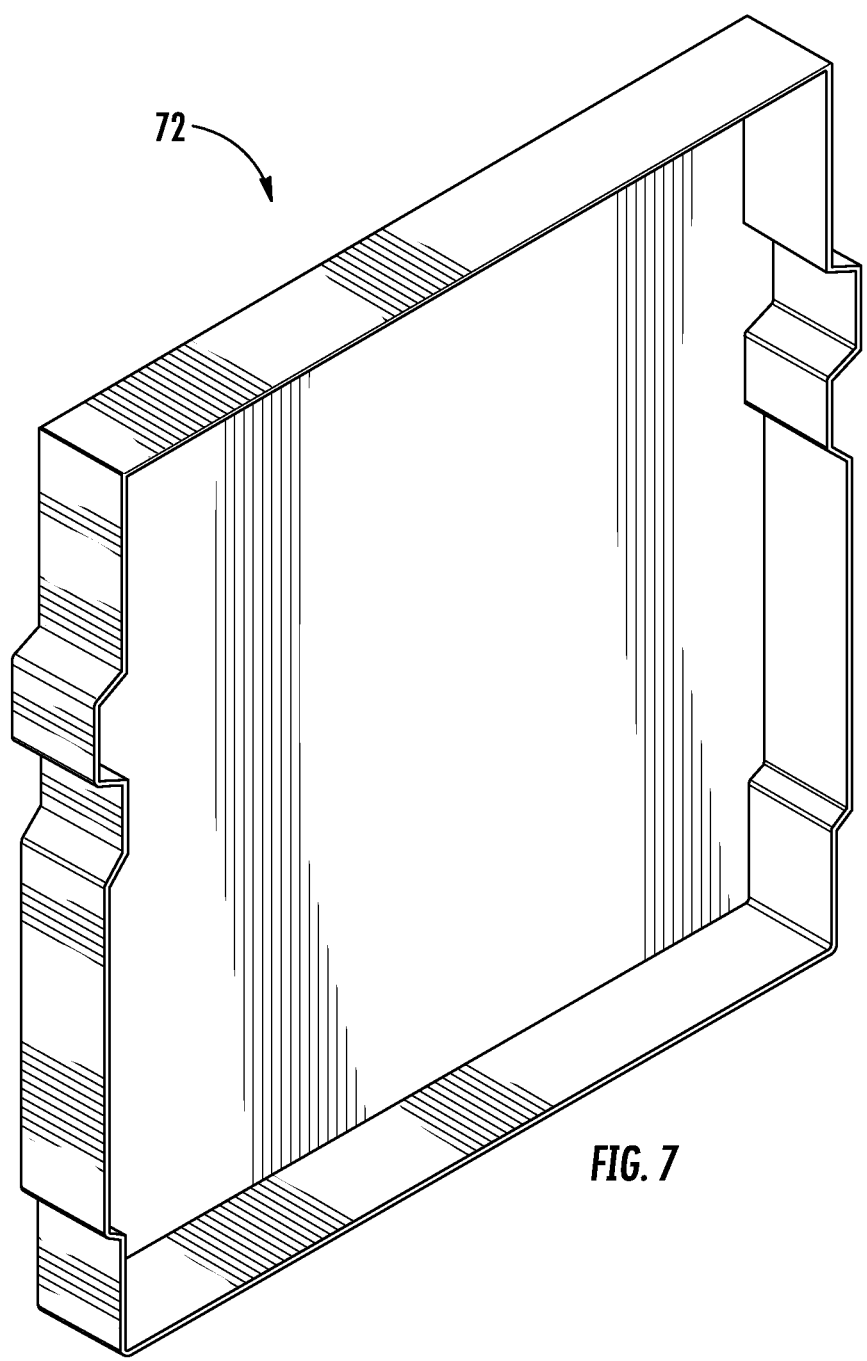
FIG. 7 is a perspective view of an embodiment of an endcap of a ceiling light LED retrofit kit in accordance with the present invention.

FIG. 7 is a perspective view of an endcap 72, for use with one embodiment the present ceiling light LED retrofit kit. In this embodiment, endcap 72 includes one or more ribs that correspond the one or more longitudinal ribs, for example, 59, along the first profile 51 and the second profile 52, respectively.

Figure 8:
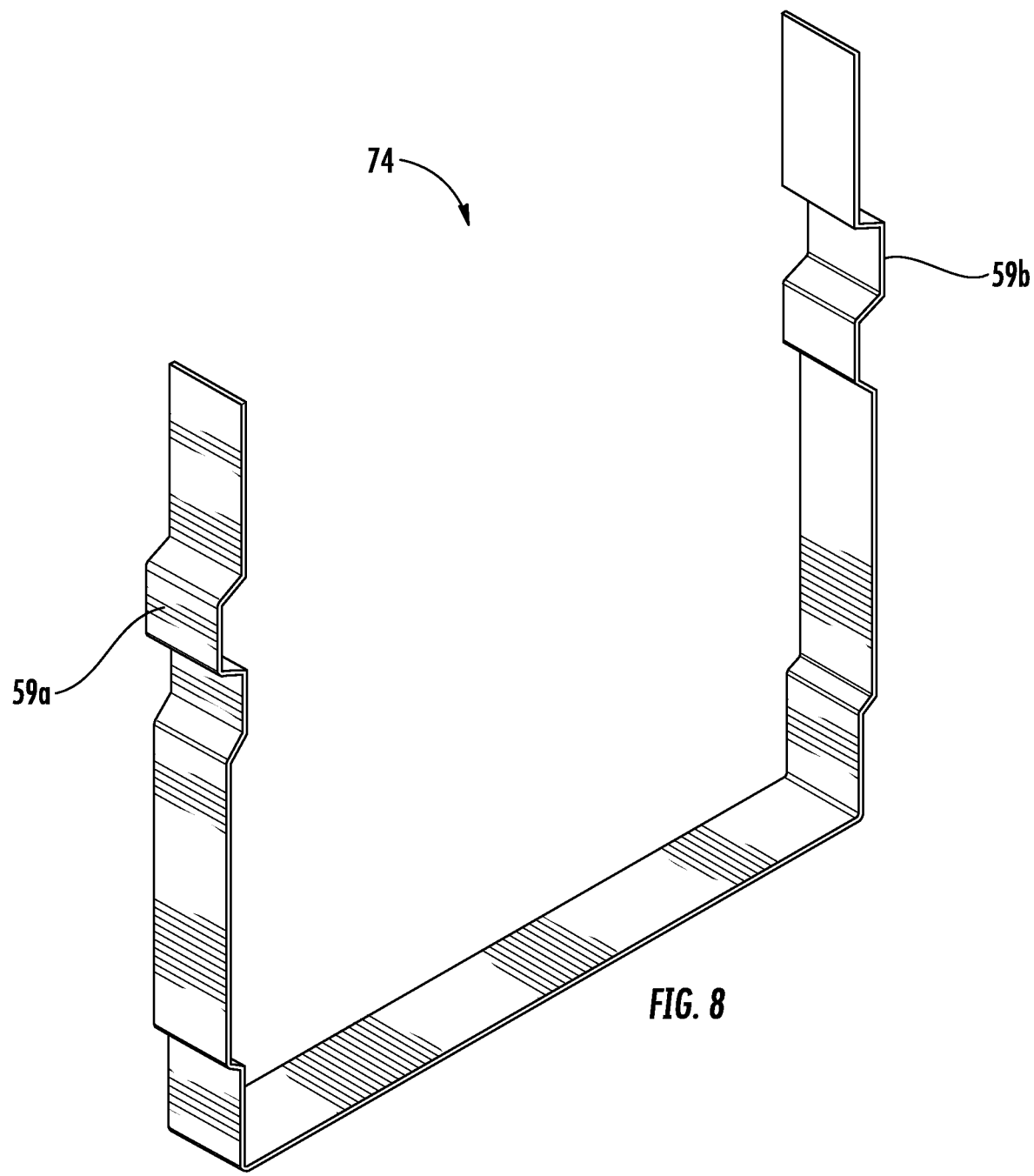
FIG. 8 is a perspective view of an embodiment of a splice of a ceiling light LED retrofit kit in accordance with the present invention.

In some applications, a plurality of light panels 40 may be disposed end to end in electrical series, for particular advantages. In such configurations, a splice 74 may be used at the juncture of any two abutting light panels 40. An embodiment of a splice 74 is depicted in FIG. 8. In this embodiment, the splice may include one or more corresponding ribs, for example, 59*a* and 59*b*, that correspond the one or more longitudinal ribs, for example, 59, along the first profile 51 and the second profile 52, respectively.

The present invention further contemplates a method for retrofitting pre-installed fixtures or bases using the kit described herein. In one embodiment, the method may include the steps of: 1) identifying a fixture having a pre-installed base having a first longitudinal side and a second longitudinal side; 2) providing a ceiling light LED retrofit kit comprising: a first profile, an opposing second profile, and a light panel, the light panel being disposed between the first profile and the opposing second profile; 3) connecting the first profile to the first longitudinal side, and the second profile to the second longitudinal side of the pre-installed base; 4) providing a light emitting diode and electrically connecting it to the light panel; and 5) covering the light panel with a lens.

So configured, the ceiling light LED retrofit kit of the present invention offers several advantages, efficiencies, and optimizations. Because it is attached to an old fluorescent light fixture, added rigidity and strength is accomplished. For that reason, for example, thinner material may be used with first profile 51 and/or second profile 52, achieving material costs savings, yet providing sufficient structural strength. Similarly, because the present ceiling light retrofit kit does not require disassembly of the first, second, and so forth electrical receptacles 21, 22 of the earlier fixture 10, labor and disposal costs are avoided. (Such electrical receptacles are sometimes referred to as "tombstones" by those with skill in this technology). Furthermore, because the previously-used, now de-energized ballast for the fluorescent light tubes can be left within the base 12, additional labor and disposal time and cost savings are achieved. As yet still a further example, the finished assembly of the within ceiling light LED retrofit kit includes a lens, rather than a previously-exposed linear fluorescent light tubes, providing a more attractive appearance and also enabling the user to provide custom refraction from the light illuminating from light emitting diode 60, as may be desired in particular applications.

While the particular ceiling light LED retrofit kit as herein shown and described is fully capable of achieving the objects of the invention, it is to be understood that it is the presently preferred embodiment of the present invention and is thus representative of the subject matter that's broadly contemplated by the present invention. It is to be further understood that the scope of the present invention fully encompasses other embodiments that may become obvious to those skilled in the art. It is intended that the present invention includes such modifications and variations as come within the scope of the appended claim and their equivalents.

The invention claimed is:

1. A retrofit kit for mounting with a previously-installed light fixture, the previously-installed light fixture having first and second electrical receptacles configured to receive therebetween a fluorescent light tube, the previously-installed light fixture being devoid of a fluorescent light tube and being electrically separated from the retrofit kit, the retrofit kit comprising:

a first end and an opposite second end;

a first profile and a second profile extending from proximate the first end to proximate the second end;

an elongated panel disposed between the first profile and the second profile, the panel having a first side for facing the light fixture and second side opposite the first side;

a light emitting diode, the light emitting diode carried by the second side;

wherein the panel, first profile, and second profile extend from proximate the first electrical receptacle to proximate the second electrical receptacle when the retrofit kit is mounted to the light fixture with the first retrofit kit side facing the light fixture; and electrical wiring to connect the light emitting diode to a power supply for illuminating the area beneath the panel second side, the electrical wiring adapted for series electrical connection to a second retrofit kit.

2. The retrofit kit of claim 1, wherein the first and second profiles extend completely from the first end to the second end.

3. The retrofit kit of claim 1, wherein the retrofit kit is adapted to at least partially conceal the light fixture when the retrofit kit is mounted with the light fixture.

4. The retrofit kit of claim 1, wherein the retrofit kit is adapted to conceal the entirety of the light fixture when the retrofit kit is mounted with the light fixture.

5. The retrofit kit of claim 1, further comprising a lens covering the second side.

6. The retrofit kit of claim 5, wherein the lens has a first lens side that is adjacent the first profile and a second lens side that is adjacent the second profile.

7. The retrofit kit of claim 6, wherein the first lens side is attached to the first profile and the second lens side is attached to the second profile.

8. The retrofit kit of claim 5, wherein the light emitting diode is attached to the second side and disposed between the lens and the second side.

9. The retrofit kit of claim 1, wherein the light emitting diode is attached to the second side between the first and second profile.

10. A retrofit kit for mounting with a previously-installed light fixture, the previously-installed light fixture having first and second electrical receptacles configured to energize a fluorescent light tube but being devoid of a fluorescent light tube, the retrofit kit comprising:
    a light panel, the light panel including a first side facing the previously-installed light fixture and an opposite second side;
    the light panel residing at least partially between the first electrical receptacle and the second electrical receptacle;
    a light emitting diode residing on the second side of the light panel; and
    an electrical conductor in electrical communication with the light emitting diode, the electrical conductor adapted for series electrical connection to a second retrofit kit and the electrical conductor residing at least in part between the first side of the light panel and the previously-installed light fixture.

11. The retrofit kit as recited in claim 10, wherein the light panel resides at least partially below the first electrical receptacle and the second electrical receptacle.

12. The retrofit kit as recited in claim 10, wherein the light panel resides at least partially above the first electrical receptacle and the second electrical receptacle.

13. The retrofit kit as recited in claim 10, wherein the electrical conductor is independent of the previously-installed light fixture.

14. The retrofit kit as recited in claim 10, wherein, upon mounting with a previously-installed light fixture, the retrofit kit at least partially conceals the previously-installed light fixture.

15. The retrofit kit as recited in claim 10, wherein the retrofit kit further includes a first profile and a second profile, the first and second profiles extending from the light panel away from the second side.

16. The retrofit kit as recited in claim 10, wherein the retrofit kit further includes a first profile and a second profile, the first and second profiles being connected with the light panel and extending from the light panel away from the second side.

17. The retrofit kit as recited in claim 10, wherein the retrofit kit further includes a first profile and a second profile, the first and second profiles being connected with the light panel and extending from the light panel away from the second side, and the electrical conductor resides at least in part between the first and second profiles.

18. A lighting assembly for mounting with a previously-installed interior ceiling light fixture having first and second electrical receptacles, the lighting assembly comprising:
    a first end disposed proximate the first electrical receptacle and a second end disposed proximate the second electrical receptacle;
    a light panel;
    a light emitting diode; and
    the lighting assembly having electrical circuitry independent of the previously-installed interior ceiling light fixture, the electrical circuitry connected with the light emitting diode and adapted for series electrical connection to a second lighting assembly.

19. The lighting assembly of claim 18, in which the electrical circuitry resides at least in part exterior to the lighting assembly.

20. The lighting assembly of claim 18, wherein, upon mounting with a previously-installed light fixture, the retrofit kit at least partially conceals the previously-installed light fixture.

21. The lighting assembly of claim 18, wherein the retrofit kit further includes a first profile and a second profile, the first and second profiles being connected with the light panel and extending from the light panel away from the second side, and the electrical conductor resides at least in part between the first and second profiles.

* * * * *